United States Patent [15] 3,671,607
Lee [45] June 20, 1972

[54] METHOD FOR IMPACT MODIFICATION OF ETHYLENICALLY UNSATURATED NITRILE POLYMERS AND POLYMER BLENDS PRODUCED THEREBY

[72] Inventor: Yoon Chai Lee, Springfield, Mass.
[73] Assignee: Monsanto Company, St. Louis, Mo.
[22] Filed: Oct. 14, 1969
[21] Appl. No.: 866,375

[52] U.S. Cl. ........................260/876 R, 99/171 R, 206/46 F, 215/1 C, 260/878 R, 260/879, 260/880 R, 260/881
[51] Int. Cl. ......................................C08f 41/12, C08f 37/18
[58] Field of Search ...........................260/876 R, 879, 880 R

[56] References Cited

UNITED STATES PATENTS

| | | | |
|---|---|---|---|
| 3,288,887 | 11/1966 | Yoshino et al. | 260/880 |
| 3,451,538 | 6/1969 | Trementozzi | 260/876 X |
| 3,515,774 | 6/1970 | Lee | 260/880 |

Primary Examiner—Murray Tillman
Assistant Examiner—Helen W. Roberts
Attorney—Richard W. Sternberg, Arthur E. Hoffman, Neal Willis and James L. Lewis

[57] ABSTRACT

A polyblend with good impact properties, good light stability, good heat stability, low water vapor transmission and low oxygen permeability has a polymerization graft component with a rubbery substrate and a composite superstrate. Initially, the rubbery substrate is grafted with a monomer mixture containing little or no nitrile monomer and generally comprised of monomers selected from the group consisting of monovinylidene aromatic hydrocarbon, alkyl esters of unsaturated carboxylic acids, unsaturated carboxylic acids, vinyl alkanoates and vinyl ethers. Thereafter, the resultant graft copolymer is admixed and grafted with a second monomer formulation containing at least 60 percent by weight of ethylenically unsaturated nitrile monomers. The resultant composite graft copolymer is then blended with a matrix of an ethylenically unsaturated nitrile polymer to provide the desired impact modified polymer blends.

18 Claims, No Drawings

METHOD FOR IMPACT MODIFICATION OF ETHYLENICALLY UNSATURATED NITRILE POLYMERS AND POLYMER BLENDS PRODUCED THEREBY

BACKGROUND OF THE INVENTION

Various synthetic polymers are employed in the fabrication of containers utilized for packaging foodstuffs and the like. Polyethylene, polypropylene and polyvinyl chloride are considered to enjoy the greatest usage at the present time for injection or blow molded containers, and sheet materials formed of polystyrene and its copolymers have been widely used for thermoforming into packages.

As has been recognized, many foodstuffs, medicines and the like tend to degrade when stores in containers formed from a resin having a high degree of oxygen permeability and/or a high degree of water vapor transmission. It is known that polymers of ethylenically unsaturated nitriles evidence good barrier properties when the nitrile content is 50 percent or higher. However, as the nitrile content is increased in an effort to improve the barrier properties, the processability of the resin is seriously impaired so that unsaturated nitrile homopolymers can be considered practical only for solvent casting procedures.

There have been a number of unsaturated nitrile interpolymers proposed in an effort to combine desirable processing characteristics with good barrier properties. Standard Oil Company of Ohio has proposed solvent casting film of an interpolymer of acrylonitrile and an acrylate ester. In addition, it has suggested forming solvent solutions of various nitrile interpolymers into thicker and more complex configurations. In Solak et al. U.S. Pat. No. 3,426,102, granted Feb. 4, 1969, it has proposed to prepare an impact resistant polymer with barrier properties by grafting a copolymer of acrylonitrile and an acrylate ester upon a rubbery substrate formed of conjugated diene and unsaturated nitrile monomers.

Applicant's assignee, Monsanto Company, has developed a number of nitrile polymers which may be satisfactorily molded or formed into sheet material in a solvent-free condition.

In copending U.S. application, Ser. No. 642,207, filed May 29, 1967, packages having improved barrier properties are disclosed which utilize a container prepared in a solvent-free process using an interpolymer of acrylonitrile and at least one other vinylidene monomer; the resin may include a rubber substrate for improved impact resistance. In U.S. application, Ser. No. 648,223, filed June 23, 1967, there are disclosed graft polymer blends formed from a rubbery substrate and a graft superstrate of methacrylonitrile and a lower alpha-olefin such as isobutylene. In U.S. application, Ser. No. 776,250, filed Nov. 15, 1968, interpolymers of methacrylonitrile and styrene are proposed. In applicant's copending U.S. application, Ser. No. 814,154, filed Apr. 7, 1969, there are disclosed novel graft copolymer blends formed with a superstrate of an interpolymer of methacrylonitrile, monovinylidene aromatic hydrocarbon and ethylenically unsaturated nitrile. Various other polymers and graft polymer blends have been disclosed and suggested by personnel of Standard Oil Company and of Monsanto Company in an effort to achieve desirable polymers for use in packaging applications.

Generally, a relatively high degree of grafting efficiency can be obtained by conducting the grafting reaction in emulsion and redox catalyst systems have often proven highly beneficial for this purpose. However, it has also been noted that the impact properties of the blends tend to be improved as the particle size of the rubber modifier is increased to above 0.2 micron. Accordingly, there have been efforts made to agglomerate latices of rubbery polymers to a particle size in excess of 0.2 micron prior to the grafting reaction. When agglomerated rubber particle latices have been grafted with high nitrile monomer mixtures, there has been a definite tendency toward instability.

A further factor in obtaining good impact properties and good chemical resistance in high nitrile polymer blends is the need for obtaining good chemical and mechanical adhesion between the dispersed rubbery polymer phase and the matrix polymer phase. Although grafting of a chemically related polymer onto the rubbery polymer will normally provide the desired chemical adhesion to the matrix, it is necessary that there be sufficient graft superstrate to achieve this result where there is substantial dissimilarity between the rubber and the matrix. In working with high nitrile monomer graft formulations on typical preferred rubbery polymer superstrates, it has been noted that the grafting efficiency often tends to be relatively low so that a large proportion of the monomers form ungrafted matrix polymer rather than grafting onto the substrate. Recently, it has been proposed by Ludwig A. Beer, in U.S. application Ser. No. 749,941 filed Aug. 5, 1968 and assigned to applicant's assignee, to conduct a grafting operation in two steps so as to provide a polarity gradient with the shell of the graft polymer being comprised of a relatively high nitrile polymer so as to provide greater chemical affinity to the matrix polymer. This same inventor has proposed in U.S. application, Ser. No. 752,910 filed Aug. 15, 1968, to conduct a grafting reaction involving two or more monomers with the ratio of monomers being varied so that the more polar monomer comprises the bulk of the monomer formulation towards the end of the grafting reaction to provide a shell with a high concentration thereof.

It is an object of the present invention to provide a method for making a novel graft copolymer component having a rubbery substrate and a composite superstrate which is relatively rich in ethylenically unsaturated nitrile monomer so as to provide good adhesion to a nitrile polymer mixture.

Another object is to provide novel polyblends which combine desirable barrier properties, satisfactory processing characteristics, good color stability, good heat stability and desirable impact resistance.

It is also an object to provide such polyblends wherein the impact properties are maintained over extended periods of use and which may be formulated so as to exhibit substantial see-through transparency for displaying the contents of containers formed therefrom.

Still another object is to provide containers for foodstuffs, medicines and the like which exhibit desirable impact resistance and act as excellent barriers to oxygen and vapor transmission and which are highly resistant to attack by the materials stored therein as well as by the atmosphere so as to protect the contents thereof over extended periods of use.

SUMMARY OF THE INVENTION

It has now been found that the foregoing and related objects can be readily obtained by a process in which there is formed an admixture of a rubbery polymer substrate and a polymerizable monomer formulation consisting of at least 70 percent by weight of monomers selected from the group consisting of monovinylidene aromatic hydrocarbons, alkyl esters of unsaturated carboxylic acids, vinyl alkanoates, unsaturated carboxylic acids, vinyl ethers, and mixtures thereof. This admixture is subjected to polymerization conditions to effect polymerization of the monomer formulation and grafting of at least a substantial portion of the polymer being produced onto the rubbery polymer substrate, forming a graft copolymer. The resultant graft copolymer provides a superstrate to substrate ratio of at least 10:100 and is thereafter admixed with a second polymerizable monomer mixture consisting of at least 60 percent by weight ethylenically unsaturated nitrile monomer. The second mentioned admixture is subjected to polymerization conditions to effect polymerization of the monomers thereof and to produce grafting of at least a substantial portion of the polymer being produced onto the graft copolymer to form a composite graft copolymer. In the composite graft copolymer, the grafted polymers of the first and second mixtures provide a superstrate containing a total of at least 60 per cent by weight ethylenically unsaturated nitrile monomer.

Although the composite graft thus formed may be utilized per se for various applications as a rubber modified material such as those where ABS materials are employed, it has especial utility as an impact modifier for high nitrile polymers. By proper selection of the chemical composition of the rubbery polymer substrate and of polymers and the amounts thereof grafted onto the rubbery polymer substrate, the apparent refractive index of the composite graft copolymer can be closely matched to the refractive index of the high nitrile matrix polymer to provide a transparent composition having highly desirable impact strength, good chemical resistance and a balance of other properties. Such impact modification has been especially useful in the manufacture of nitrile polymer blends for packaging and other applications.

Although the theory of operation is not fully understood, it is believed that the initial monomer formulation which contains little if any nitrile monomer stabilizes the rubbery polymer and facilitates the subsequent grafting of the high nitrile monomer mixture. It is believed that the initial monomer formulation may produce grafted interpolymer within the rubbery polymer particle as well as on the surface thereof with the chains on the surface tending to orient themselves relatively closely adjacent thereto. The subsequent polymerization of the nitrile monomers is believed to produce polymer chains which graft primarily on the surface of the rubbery polymer particle and the polymer chains tend to project outwardly from the surface of the rubbery particle substrate, particularly when fused within a relatively polar nitrile polymer matrix for which the nitrile polymer superstrate has greater affinity. As a result of this gradient from the surface of the rubbery polymer particle to the shell of the graft copolymer, the highly polar nitrile polymer tends to be concentrated in the shell so as to provide highly desirable adhesion to the polar nitrile polymer matrix.

DESCRIPTION OF THE PREFERRED EMBODIMENTS

As previously indicated, the novel composite graft copolymer of the present invention is comprised of a rubbery polymer substrate and a superstrate formed of at least two different polymers, the total unsaturated nitrile monomer content being at least 60 percent by weight of the super-strate. Although the polymerization blend may be used per se particularly when there is a substantial amount of ungrafted polymer formed, it will generally be employed in a blend with separately prepared high nitrile polymer such as a methacrylonitrile polymer. The characteristics and utility of the graft copolymer will vary depending upon various factors of composition and the technique of preparation as will be pointed out in detail hereinafter.

NATURE OF THE RUBBER POLYMER SUBSTRATE

The rubbery polymers onto which the interpolymers may be grafted during the polymerization in the presence thereof to provide the substrate of the graft copolymer may be essentially saturated rubbers or diene rubbers, or mixtures thereof, i.e., any rubbery polymers ( a polymer having a second order transition temperature not higher than 0° C., preferably not higher than −20° C., as determined by ASTM Test D–746–52 T). The invention has been highly advantageously employed with rubbery polymers of one or more conjugated 1, 3 dienes, e.g., butadiene, isoprene, piperylene, chloroprene, etc. Such rubbers include homopolymers interpolymers of conjugated 1,3-dienes with up to about 45 percent by weight of one or more copolymerizable monoethylenically unsaturated monomers, such as monovinylidene aromatic hydrocarbons e.g., styrene; an ar-alkylstyrene, such as the o-, m-, and p-methylstyrenes, 2,4-dimethylstyrene, the ar-ethylstyrenes, p-tert-butylstyrene, etc; an alpha-alkylstyrene, such as alpha-methylstyrene, alpha-ethylstyrene, alpha-methyl-p-methylstyrene, etc; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; and the like. Because of the desire to maintain barrier properties, any diene polymer desirably contains 10–30 percent by weight of an ethylenically unsaturated nitrile monomer component.

The saturated rubbery polymers which may be grafted are essentially saturated rubbery substrates selected from the group consisting of elastomeric monoolefin polymers and elastomeric polymers of alkyl esters of monounsaturated carboxylic acids wherein the alkyl group of the alkanol contains three to 18 carbon atoms and wherein the carboxylic acid contains three to 18 carbon atoms and there are one to two carboxylic acid groups, the elastomeric polymers containing not more than 10 percent by weight of a comonomer having multiolefinic unsaturation.

The elastomeric monoolefin polymers consist at least principally of monoolefins of two to eight carbon atoms and contain less than 10 percent, and preferably less than 5 percent, by weight of any monomer having multiple olefinic unsaturation so as to provide residual unsaturation in the rubbery polymer. Exemplary monoolefin monomers are ethylene, propylene, butylene, isobutylene, and mixtures thereof. Exemplary comonomers are vinyl esters such as vinyl acetate, and vinyl propionate, $C_1$–$C_8$ alkyl esters of alkacrylic acid such as methyl methacrylate, ethylenically unsaturated nitriles such as methacrylonitrile and ethacrylonitrile, $C_4$–$C_{12}$ diolefins such as hexadiene, heptadiene and octadiene, and cross-linking agents such as diallyl methacrylate, diallyl maleate and divinyl benzene. Cross-linking agents may be desirable from the standpoint of providing optimum properties to the rubbery polymer within the composition but should be used in amounts of less than about 2 percent by weight. When ethylene is employed as a monoolefin, it is desirably copolymerized with another monoolefin or halogenated to provide a rubbery chlorinated polyethylene substrate. Suitable elastomeric monoolefin polymers are polyisobutylene, ethylene/propylene copolymers, ethylene/propylene/diolefin terpolymers containing less than 10 percent diolefin, ethylene/propylene/diallyl carboxylate terpolymers containing less than 5 percent of the diallyl carboxylate, ethylene/vinyl acetate copolymers containing 15–50 percent by weight of the vinyl acetate and chlorinated polyethylene. The preferred olefin polymers are those comprised of at least 70 percent by weight of the lower molecular weight alpha-monoolefins.

The elastomeric polymers of the alkyl esters of monounsaturated carboxylic acids are comprised of at least 75 percent by weight of the carboxylic acid and may contain up to 25 percent by weight of one or more copolymerizable monomers so long as the comonomers do not destroy the desired rubbery characteristics. If a diolefin or other polyunsaturated monomer is employed, it should comprise less than 10 percent, and preferably less than 5 percent of the polymer. Generally, non-elastogenic monomers should comprise less than 20 percent, and preferably less than 15 percent, of the interpolymers. The carbon chain in the alkyl group of the alkanol component in the ester contains three to 18 carbon atoms and preferably four to 10; exemplary alkanols are butanol, pentanol and hexanol. The carboxylic acid component may have one or two carboxylic acid groups; in the latter case, the monomers will be a diester. The carbon chain of the carboxylic acid component may contain three to 18 carbon atoms and preferably contains three to 10. Exemplary carboxylic acid groups are acrylic acid, maleic acid, fumaric acid and itaconic acid. The preferred carboxylic acid is acrylic acid although it may be desirably used in combination with elastogenic esters of the other carboxylic acids.

The comonomers may include monoethylenically unsaturated monomers such as the monovinylidene aromatic hydrocarbons (e.g., styrene; alpha-methylstyrene); alkyl alkacrylates (e.g., methyl methacrylate; ethyl ethacrylate); vinyl esters (e.g., vinyl acetate, vinyl propionate); ethylenically unsaturated nitriles(e.g., acrylonitrile, methacrylonitrile); acrylamides (e.g., acrylamide, methacrylamide); alpha-olefins (e.g., ethylene, propylene); carboxylic acids (e.g., acrylic acid, methacrylic acid); and the like. The comonomers also include rubber forming diolefins such as butadiene, pentadiene and hexadiene; and difunctional or polyunsaturated cross-linking agents such as divinyl benzene, diallyl maleate, diallyl fumarate, allyl acrylate, ethylene glycol dimethacrylate, etc.

As previously indicated, polyunsaturated comonomers should comprise less than 10 percent and preferably less than 5 percent of the rubbery polymer. When a cross-linking monomer is employed, it should comprise less than 5 percent and preferably less than 2 percent of the polymer. When the rubbery polymer is to include any relatively large amount of comonomer (as for matching of refractive index), the comonomers will be provided in principal measure by the monoethylenically unsaturated monomers which may be used in combination with each other and with small amounts of polyunsaturated monomers.

Exemplary of the carboxylic ester rubbery polymers are the polymers of butyl acrylate; hexyl acrylate; octyl acrylate, butyl maleate; hexyl itaconate; butyl acrylate/hexadiene; hexyl acrylate/butadiene; octyl acrylate/octadiene; butyl acrylate/tricyclodecenyl acrylate; butyl acrylate/ethylene glycol dimethacrylate; butyl acrylate/vinyl acetate; butyl acrylate/styrene; butyl acrylate/methyl methacrylate, etc. The preferred carboxylic ester rubbery polymers are those comprised at least principally of $C_4$-$C_{10}$ acrylate esters, most desirably such esters comprise at least 80 per cent of the polymer.

It should be appreciated that the two classes of rubbery polymers may be used in admixture with each other as well as in admixtures of rubbery polymers within the class to provide the substrate for a single grafting reaction, or for separate grafting reactions with the products being combined. Various techniques are customarily employed for polymerizing the monomers of the rubbery polymer including mass, suspension and emulsion polymerization. The particular technique most advantageously chosen will vary with the monomers being polymerized, the particle size being sought and the nature of the subsequent graft polymerization process. Emulsion polymerization can be used to produce a latex emulsion which is useful as the base for emulsion polymerization of the graft polymer component or the rubbery polymer latex may be suspended for a suspension polymerization reaction.

When transparency is not desired, the average particle size of the rubbery polymer substrate prior to grafting may vary from as little as 0.01 micron to as large as about 10.0 microns, and preferably about 0.1 to 2.0 microns for optimum benefit to impact properties. If a transparent composition is desired, the average particle size should not be larger than about 1.0 micron and preferably about 0.2 to 0.7 micron. However, it will be appreciated that minor amounts of the rubbery polymer substrate may be of larger particle size even when a transparent composition is desired albeit with a tendency toward haze.

When a rubbery polymer latex is employed having a smaller average particle size than that desired, the particles may be agglomerated into the desired particle size range by chemical or mechanical means. Acidulation and freeze-thaw techniques are widely employed for this purpose, and more recently pressure agglomerating techniques have been suggested for this purpose.

THE POLYMERIZABLE MONOMER FORMULATIONS
OF THE SUPERSTRATE

As previously indicated, the first polymerizable monomer formulation is one which is low in or free from ethylenically unsaturated nitriles. At least 70 percent by weight thereof is provided by monomers selected from the group consisting of monovinylidene aromatic hydrocarbons, alkyl esters of unsaturated carboxylic acids, vinyl alkanoates, unsaturated carboxylic acids, vinyl ethers, and mixtures thereof. The second polymer formulation is one which contains at least 60 percent by weight ethylenically unsaturated nitrile monomers and which may contain up to 40 percent of copolymerizable monomers such as those of the first polymerizable monomer formulation.

Although the method of the present invention has previously been described as being conducted with two distinct polymerizable monomer formulations in two separate polymerization steps, it should be appreciated that the two steps can be blended into each other and that, accordingly, the two formulations can be blended into each other in a process where monomers are added during the course of polymerization. In such a technique, the first monomer formulation would be provided by the monomers present initially during the grafting reaction and thereafter nitrile monomer would be added during course of the polymerization reaction to provide the equivalent of the second or high nitrile monomer polymerizable formulations as the grafting reaction progressed.

The amount of the first polymerizable monomer formulation relative to the amount of substrate may vary fairly widely depending upon the efficiency of the grafting reaction and the composition of the formulation. As previously indicated, of the total graft superstrate provided by the two monomer formulations, at least 60 percent by weight must be formed from ethylenically unsaturated nitrile monomer. Since it is the objective of the present invention to stabilize the rubbery substrate and improve the graftability thereof by the high nitrile monomer formulation, the weight ratio of the first monomer formulation to substrate will normally be about 15–150:100 parts by weight, and preferably about 25–75:100. It is essential that the superstrate to substrate ratio resulting from the polymerization of the first monomer formulation be at least 10:100 and preferably about 20–50:100. Since the barrier properties of the composition will vary with the amount of non-nitrile polymer content, it is generally desirable to minimize the amount of ungrafted polymer formed from the first polymerizable monomer mixture.

The ratio of the second polymerizable formulation to rubbery polymer substrate also may vary fairly widely depending upon the amount of superstrate produced by the first polymerizable formulation in view of the requirement that the nitrile monomer content comprise at least 60 percent by weight of the total graft superstrate. Generally, the ratio of monomer to substrate will be about 50–250:100 and preferably about 75–150:100. For economy of operation, the grafting reaction is ideally conducted under relatively efficient conditions so as to minimize the amount of ungrafted interpolymer which is formed, although any ungrafted nitrile polymer would normally not adversely affect the barrier properties of the blend.

Exemplary of the monovinylidene aromatic hydrocarbons which may be used in the superstrate are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethyl-styrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methyl-styrene, etc.; vinyl naphthalene; vinyl anthracene, etc. The alkyl substitutents generally have one to four carbon atoms and may include isopropyl and isobutyl groups. If so desired, mixtures of such monovinylidene aromatic monomers may be employed. Styrene and ring-substituted styrenes are preferred since the alpha-alkyl styrenes do not have a hydrogen in the position alpha to the double bond and thus are not so effective in preventing depolymerization of the methacrylonitrile interpolymer. However, alpha-alkyl styrenes may be advantageously employed in relatively small amounts from the standpoint of providing improved heat distortion properties to the interpolymer. In order to minimize the possible loss in barrier properties, the monovinylidene aromatic hydrocarbon content of the graft superstrates should not comprise more than about 15 percent by weight of the total thereof.

The non-nitrile vinylidene monomers that may be used in the first monomer formulation in addition to monovinylidene aromatic hydrocarbons are preferably relatively polar in character so as to minimize the detriment to the barrier properties of the superstrate. Exemplary of the vinyl alkanoates or vinyl esters of carboxylic acids are vinyl acetate, vinyl propionate, etc. Exemplary of the alkyl esters of unsaturated carboxylic acids are methyl acrylate, ethyl acrylate, butyl acrylate, methyl methacrylate, dimethyl fumarate, diethyl fumarate, dimethyl maleate, etc. The vinyl alkyl ethers are those wherein the alkyl group contains one to 16 carbon atoms such as vinyl ethyl ether, vinyl butyl ether, etc. Exemplary of the unsaturated carboxylic acids are acrylic acid, alkacrylic acids such as methacrylic acid and ethacrylic acid; maleic acid, fumaric acid, and the anhydrides thereof such as maleic anhydride, fumaric anhydride, etc.

In addition to the foregoing monovinylidene aromatic hydrocarbon and polar vinylidene monomers, the monomer formulation may contain up to 30 percent by weight of other copolymerizable vinylidene monomers. Ethylenically unsaturated nitrile monomers may be employed in amounts not to exceed about 20 percent or the amount of the nitrile content of the rubbery polymer superstrate, whichever is greater, in order to facilitate the stabilization of the rubbery polymer and the formation of the gradient structure in the superstrate. Such nitriles include acrylonitrile, methacrylonitrile, ethacrylonitrile, 1-cyanopropylene, 1-cyanobutene, dycyanoethylene, and dicyanobutene. Vinyl halides such as vinyl chloride and vinyl fluoride and vinyl amides such as acrylamide and methacrylamide may also be employed.

It will be appreciated that the first monomer formulation may be a mixture of two or more of the monomers of the specified group with or without other copolymerizable monomers in order to obtain the benefits afforded thereby. The preferred monomers are monovinylidene aromatic hydrocarbons and acrylate esters such as butyl acrylate and methyl acrylate, and mixtures of these two classes of monomers. A particularly preferred composition is provided by 15 to 30 percent by weight of a monovinylidene aromatic hydrocarbon such as styrene and 85 to 70 percent by weight of an alkyl acrylate such as butyl acrylate.

The second polymerizable monomer formulation must contain at least 60 percent by weight ethylenically unsaturated nitrile monomer. Exemplary nitrile monomers are acrylonitrile, methacrylonitrile, 1-cyanopropylene, 1-cyanobutene, dicyanoethylene and dicyanobutene. Methacrylonitrile and ethacrylonitrile are preferred and the former has proven most advantageous in affording good processing characteristics even when it provides a very large proportion of the total graft superstrate.

The second monomer formulation may contain up to 40 percent by weight of copolymerizable vinylidene monomers of the classes hereinbefore described. Preferably, the amount thereof is less than 25 percent, and most desirably about 5–15 percent, to provide a shell of polymer which is very rich in nitrile monomer.

Although methacrylonitrile is the preferred nitrile monomer a homopolymer thereof has a tendency to depolymerize or unzip during high temperature processing. Accordingly, minor amounts of the comonomers such as monovinylidene aromatic hydrocarbons or polar monomers having a hydrogen in the position alpha to the double bond afford very real benefits in blocking such a tendency. Thus, methacrylonitrile monomer formulations desirably contain 5–25 percent, and preferably 5–15 percent, of monovinylidene aromatic hydrocarbon monomers and polar vinylidene monomers with an alpha hydrogen.

Although the polymers of the composite graft superstrate may contain as little as 60 percent by weight of ethylenically unsaturated nitrile monomer, the nitrile content is preferably at least 75 percent by weight thereof.

By proper selection of the rubbery polymer substrate composition and of the particular monomers and the ratios thereof, the apparent refractive index of the composite graft superstrate may be matched with that of the substrate or used to offset that of the substrate so that the apparent refractive index of the graft copolymer component will match that of the nitrile polymer matrix with which it is to be blended. Thus, it is possible to produce highly desirable transparency in the polymer blends of the present invention.

THE GRAFT POLYMERIZATION PROCESS

Various techniques are customarily employed for graft polymerizing the monomers of the superstrate onto the rubbery polymer substrate including mass, suspension, solution and emulsion polymerization techniques, and combinations thereof. Emulsion and suspension polymerization techniques have proven particularly useful.

In the emulsion graft polymerization process, the monomers and rubbery polymer substrate are emulsified in a relatively large volume of water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate, sodium lauryl sulfate and other sodium soaps. Generally, the emulsifying agent is provided in amounts of about 1 to 15 parts by weight per 100 parts by weight of the monomers but the amount should not reduce the particle size of the dispersed phase unduly. The amount of water in which the monomers and rubbery polymer substrate are emulsified may vary depending upon the emulsifying agent, the polymerization conditions and the particular monomers. However, it should be appreciated that the ratio of the monomer to water will tend to affect the size of the dispersed particles. Generally, the ratio of water to monomer with alkali metal soaps will fall within the range of about 80–300:100, and preferably about 150–250:100. If so desired, an aqueous latex formed in the emulsion polymerization of the rubbery polymer substrate may provide the aqueous medium into which the monomers are incorporated with or without additional emulsifying agents, etc. However, the rubbery polymer may be dispersed in the monomers and the mixture emulsified, or a latex thereof may be separately prepared.

In a suspension polymerization process, the rubbery polymer and monomers are suspended in water by means of various suspending agents such as polyvinyl alcohol, hydroxymethyl cellulose, the interpolymers of 2-ethyl hexyl acrylate and acrylic acid, etc. The amount thereof will usually be about 0.1–2.0 parts per 100 parts monomer depending upon the particular agent or suspending agent system selected. Generally, the water to monomer ratio may vary from 0.5–3.0:1.0 and is normally about 1.0–2.5:1.0. As previously indicated, the rubbery polymer latex may be suspended to provide the substrate for a suspension graft polymerization process. When a mass or suspension graft polymerization reaction is employed, the rubbery polymer will comprise 5–25 percent, and most usually 10–20 percent of the monomer charge.

Although actinic radiation and both water-soluble and monomer-soluble peroxy-type and perazo-type catalysts with or without a reducing agent to form a redox system may be employed for the graft polymerization reaction, it has been found highly advantageous to use a redox system with a monomer-soluble catalyst for emulsion polymerization reactions. Redox systems offer the advantage of permitting the use of slower catalysts with equivalent conversion periods. For suspension polymerization reactions, oil-soluble catalysts are employed.

Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide, dibenzoyl peroxide, di-lauroyl peroxide, di-oleyl peroxide, ditoluyl peroxide, di-tert-butyl diperphthalate, di-tert-butyl peracetate, di-tert-butyl perbenzoate, di-cumyl peroxide, di-tert-butyl peroxide, di-isopropyl peroxy dicarbonate, 2,5-dimenthyl-2, 5 di-(tert-butylperoxy) hexane, 2,5-dimethyl-2,5-di(tert-butylperoxy) hexyne-3, di-tert-butyl hydroperoxide, cumene hydroperoxide, p-menthane hydroperoxide, cyclopentane hydroperoxide, diisopropylbenzene hydroperoxide, p-tert-butylcumene hydroperoxide, pinane hydroperoxide, 2, 5-dimenthylhexane, 2,5-dihydroperoxide, etc.; azo-di-isobutyonitrile; and mixtures thereof.

The catalyst is generally included with in the range of 0.001 to 1.0 percent by weight, and preferably on the order of 0.005 to 0.5 percent by weight of the polymerizable material, depending upon the monomers and the desired polymerization cycle.

Exemplary of the reducing agents which may be employed are alkali metal and ammonium sulfites, hydrosulfites, metabisulfites, thiosulfates, sulfinates, alkali metal formaldehyde sulfoxylates, ascorbic acid, dioxyacetone, dextrose, etc. Various other reducing agents for redox systems may also be employed. The amount of reducing agent will be about 0.001 to 1.0 percent by weight, and preferably on the order of 0.005 to 0.5 percent by weight of the polymerizable monomer formulation, depending on the catalyst and the amount thereof. Minute amounts of activators or promoters such as ferrous salts and copper salts may be included in the redox systems.

Molecular weight regulators may be included in the formulation for the graft polymerization reaction so as to control the molecular weight and achieve the desired properties. Exemplary of such molecular weight regulators are the higher alkyl mercaptans and terpenes specifically N-dodecyl mercaptan, tert-dodecyl mercaptan, terpinolene, d-limonene, etc.

The particular polymerization conditions employed will vary with the monomer formulation, the catalyst and the polymerization technique. Generally, the reaction will increase with an increase in temperature although a limiting factor is possible deterioration in product properties and also a tendency to produce problems in maintaining latex stability. Generally, temperatures of about 30° to 100° C. and pressures of about 0–50 p.s.i.g. have been found suitable for a fairly efficient emulsion graft polymerization reaction. If so desired, an inert atmosphere may be employed over the polymerizing latex. For suspension graft polymerization reactions, temperatures of 100°–200° C. are employed.

After the polymerization reaction has proceeded to the desired degree of conversion of the monomers, which will normally be more than 80 percent, any unreacted monomers should be stripped. After the graft polymerization, the graft copolymer blend may be recovered from emulsion processes by various techniques of coagulation in the form of a crumb, or by evaporation, and is washed for subsequent processing. Alternatively, the latex may be combined with a latex of the matrix polymer and coagulated or spray dried therewith. In suspension polymerization reactions, the polymeric product is recovered in the form of beads which are washed and dried. The amount of ungrafted interpolymers produced by the graft polymerization reaction will vary with the type and efficiency of the graft reaction and the ratio of monomer formation to rubbery polymer substrate in the charge. By these factors, the amount of ungrafted polymer in an emulsion reaction will normally vary within the range of about 10 to 150 parts of grafted rubbery polymer substrate with the higher ratios being produced by high monomer/substrate charges. For suspension reactions, the amount of ungrafted polymer normally will be considerably higher; i.e., about 50–500 parts per 100 parts of ungrafted rubbery polymer substrate.

THE MATRIX INTERPOLYMER

As previously indicated, the graft polymerization reaction will generally produce some ungrafted polymer and the amount thereof will vary with the ratio of monomer formulation charged to rubbery polymer and the conditions of polymerization so that a high nitrile polymer matrix could be produced by the second polymerizable formulation. However, the matrix polymer may desirably have a composition or molecular weight which deviates from that of the superstrate polymer, and economy of operation dictates efficient grafting.

Generally, it is advantageous to conduct an emulsion graft polymerization reaction under conditions which are reasonably efficient so that the rubbery content of the emulsion product will range from about 25 to 55 percent thereof. Suspension polymerization reaction will yield products with about 5 to 25 percent rubbery substrate. Normally, the rubbery substrate content desired for the polyblends of the present invention will be in the range of 3 to 50 percent by weight and preferably 5 to 20 percent. Thus, it is generally preferred to prepare matrix interpolymer by a separate reaction and this matrix interpolymer is then blended with the graft polymer component which may include (and will normally include) some ungrafted interpolymer.

The matrix interpolymer contains 60 to 95 percent ethylenically unsaturated nitrile monomer. 0 to 15 percent monovinylidene aromatic hydrocarbon monomer and 0 to 40 percent of polar vinylidene monomers. As in the case of the superstrate polymer, the preferred nitrile monomer is methacrylonitrile, and comonomers having hydrogen in the position alpha to the double bond are desirable to minimize any tendency for the methacrylonitrile chains to unzip. The preferred matrix interpolymers contain comonomers in the amount of 5 to 25 percent by weight, and preferably the components of the matrix interpolymer are the same or similar to those of the second graft polymerizable formulation although the ratios may vary.

In all instances the total nitrile monomer content of the matrix interpolymer must be at least 60 percent by weight thereof and preferably at least 75 percent thereof. The preferred interpolymers contain at least 65 percent by weight of methacrylonitrile.

The method used to prepare the matrix interpolymer may be any which is commonly practiced in the art; the polymerization may be effected en masse, in solution or with the monomer in an aqueous disperson as an emulsion or suspension. From the standpoint of economics and process control, highly suitable polymers can be prepared by a method in which the monomers are suspended in water since emulsion polymerization tends to introduce coloring impurities in the polymer by reason of the salts used for coagulation, the emulsifying agents, etc.

Since transparent blends are desirable or packaging applications, the refractive index of the matrix interpolymer should closely approximate the apparent refractive index of the graft copolymer component. Although the refractive index may be measured in each instance, it is possible to present graphically the refractive indices of the various resinous and rubbery interpolymers and then calculate the refractive index for the graft copolymer component.

OTHER COMPONENTS

Various other optional materials may be added to the compositions of the present invention depending upon the intended use and nature thereof such as, for example, plasticizers, stabilizers, antioxidants, lubricants, processing aids and fillers. The amount and nature thereof will determine the possible effect upon the tranparency of the blends. Generally, it is necessary to incorporate stabilizers and antioxidants to prevent degradation of the graft polymer component. Although the stabilizers and antioxidants may be incorporated at the time of blending of the components into the final polyblend, generally it is most advantageous to incorporate these materials into the individual components after they are formed so as to minimize the tendency for degradation or oxidation during processing and storage.

FORMATION OF THE POLYMER BLENDS

The final polymer blends may be prepared by admixing the components thereof in any of the customary ways including mill rolling, extrusion blending, etc. Where the matrix polymer is prepared by an emulsion polymerization process, the latex thereof may be admixed with a latex of the graft copolymer blend and the mixed latex coagulated, washed and dried.

Generally, the polymer blends may contain 3 to 50 percent by weight of rubber provided by the rubbery substrate of the graft copolymer blend and the preferred compositions will normally contain about 5 to 20 percent. Polymer blends produced in accordance with the present invention may be substantially transparent, i.e., the transmittance through a molded specimen of 0.05 inch in thickness at 500 millimicrons wave length may have a value of at least 70 percent and generally considerably greater. In fact, suspension matrix polymers having a definite yellow cast may be brought to a clear white blend when admixed with a suitably formulated graft copolymer component. To achieve this result, the refractive indices of the graft copolymer blend and matrix polymer must be closely matched, and the average particle size of the graft copolymer component should be less than about 0.7 micron. The transparent compositions may vary from water clear to slightly yellow, depending upon the rubbery polymer component and impurities. Yellowish coloration can be neutralized by incorporation of the appropriate blue dyes. However, blends which may be produced in accordance with the invention afford significantly advantageous transparency enabling their application to packaging, laminating and other uses where transparency is advantageous and where the remaining balance of properties offers significant advantages.

PROPERTIES AND PROCESSING OF THE POLYBLENDS

The polyblends of this invention exhibit oxygen permeability of less than 6.5 cc. of oxygen for a film of 1 mil thickness and 100 square inches over a period of 24 hours at one atmosphere (760 mm.) of oxygen and at 73° F., and a water vapor transmission rate (WVT) of less than 8.5 grams for such film of equivalent dimensions over a 24 hour period maintained at 100° F. and 95 percent relative humidity (R.H.). Desirably, the oxygen permeability is less than 3.0 cc. and the water vapor permeability is less than 3.0 gms. The Izod impact value should be at least 0.5 foot pounds per inch of notch and is preferably at least 1.0 foot pounds. Four ounce Boston round bottles should have an estimated mean fall height of at least 3 feet on a bottom drop test using the method of ASTM Test D2463-65T.

High methacrylonitrile content for the matrix polymer provides excellent barrier properties while at the same time providing interpolymers which may be satisfactorily processed in conventional equipment in a solvent-free condition. The monovinylidene aromatic hydrocarbon imparts to the interpolymer improved processability. Color stability, heat stability, improved heat distortion and improved modulus. Although it tends to prevent or limit depolymerization of the methacrylonitrile sequences, it has a detrimental effect upon the barrier properties. By including a polar vinylidene monomer having hydrogen in the position alpha to the double bond, the barrier properties of the interpolymer may be maintained substantially while at the same time minimizing the tendency towards depolymerization by chain sequence interruption. The proper selection of the polar vinylidene monomers will also facilitate processability.

The polyblends of the present invention may be formed in conventional processing equipment including injection molding apparatus, blow molding apparatus and extrusion apparatus. In addition, the polyblends may be compression molded if so desired. The processability of the polyblends is satisfactory for use in conventional equipment without the need for employing solvents, lubricants or other flow modifiers. The improvement in processability of methacrylonitrile polymers provided by the additional monomer components is quite significant and the avoidance of degradation of the high methacrylonitrile polymers is particularly significant for food package applications. Moreover, color is not imparted to the resin during processing whereas an unmodified high methacrylonitrile polymer would tend to assume a dark red color upon processing, presumably due to degradation.

Packaging sheet materials may be prepared from the polyblend by extrusion, pressing, calendering, casting and by other means well known to those skilled in the art. Bottles and containers may be made by any of the conventional methods such as blow extrusion, injection molding, vacuum forming casting, etc. When the sheet materials of the polyblends of this invention are subjected to uniaxial or biaxial orientation, still further improvements in the water vapor permeability are noted. When the films are so oriented, it is preferred that they be stretched at least about 300 percent in one or both directions. It is further preferred that the stretching be carried out at a rate of at least about 2,000 percent per minute. The preferred rate of stretching ranges 10,000–20,000 percent per minute.

Biaxial stretching can be effected in a single or continuous operation. In piece operation, a lazy-tongs-type cross-stretcher can be used to advantage, whereas in continuous-type operations either tenter-type cross-stretching frames or blow-extrusion techniques can be used. When tenter-frames are used, the differential in speed between the front and rear rollers develops longitudinal stretching, while simultaneously the lateral spacing of the frame develops transversel stretching so that the sheet material is biaxially stretched in both directions.

Although the polyblends of the present invention have been indicated as being formed by a single graft polymerization component, it will be appreciated that the polymerization graft component need not be homogeneous. It may be comprised of two or more polymerization graft components for benefits which may be obtained thereby. As described in copending applications of applicant's assignee, polyblends containing a highly grafted rubber particle and a relatively lightly grafted rubber particle, and/or a relatively large grafted particle and a relatively small grafted particle, offer certain significant advantages in terms of balance of properties. Such grafted particles of different morphology may be prepared in separate reactions, or in the same reaction, by proper choice of components. Thus, although the graft polymer of the present invention will have a superstrate to substrate ratio of 20–200:100 and preferably 25–100:100, one particle may have a ratio of 20–45:100 and another may have a ratio of 55–150:100 with the amounts thereof being varied. Similarly, the size of the particles may be multimodal or broadly distributed.

In addition, the polyblends of the present invention may be mechanically blended with other polar polymers to form "alloys" offering certain advantageous properties, forgiven applications or to facilitate lamination. Among such polar polymers are polycarbonate, polyvinyl chloride and polysulfone resins; generally, such polar polymers may be included in amounts of up to 30 percent by weight of the total mechanical blend.

Exemplary compositions of the present invention are the following specific examples, wherein all parts are parts by weight except where otherwise indicated.

EXAMPLE ONE

Part A

A latex of butadiene acrylonitrile (66/34) copolymer having a particle size of about 0.2 micron is employed as the substrate for the grafting reaction. To a reactor are added 350 parts of the latex (containing 210 parts solids), 600 parts water, 2.5 parts sodium lauryl sulfate, 0.42 parts ferric sulfate solution, 0.42 part of an aqueous solution of ethylene diamine tetraacetic acid-disodium salt, and 5.0 parts of sodium formaldehyde sulfoxylate solution. The mixture is stirred and the reactor is purged with nitrogen, after which are then added 30 parts n-butyl acrylate, 12 parts styrene and 0.17 part cumene hydroperoxide. The mixture is heated to 60° C. and is held at temperature with stirring for a period of 4 hours.

To the polymerized latex are added 420 parts water, 0.8 parts sodium lauryl sulfate, 1.7 parts of a solution of ethylene diamine tetraacetic acid-disodium salt, 10 parts sodium formaldehyde sulfoxylate solution with agitation. There are admixed 151 parts methacrylonitrile, 17 parts styrene, 0.77 part cumene hydroperoxide and 0.2 part terpinolene, and this monomer formulation is added to the latex over a period of 2½ hours while the contents of the reactor are held at 60° C. with stirring. Subsequent to the completion of monomer addition, the reactor contents are held at 60° C. for an additional 3 hours before cooling. The latex is then cooled to 25° C. and a magnesium sulfate solution is added to effect coagulation thereof. Prior to coagulation, one part of 2,6-ditertiary butyl p-cresol is added as an antioxidant and stabilizer. The coagulum is filtered, washed with water and dried.

Part B

To 220 parts water are added 180 parts methacrylonitrile, 8 parts styrene, 0.2 part di-tert-butyl para-cresol, 1.2 parts sodium sulfate, 0.44 part ditert-butyl peroxide and 0.1 part terpinolene. This mixture is heated at 130° C. for a period of time sufficient to produce conversion to polymer of about 25 percent of the monomers initially added; at this point there are added as a suspending agent 14 parts of a 2 ½ percent solution of an interpolymer of 4.5 percent 2-ethylhexyl acrylate and 95.5 percent acrylic acid. The suspension is then heated to about 140° C. in a period of about 2 hours and held at that temperature for 3 hours to complete polymerization. During the polymerization cycle, 12 parts styrene monomer are added continuously over a period of about the last 5 hours.

At the end of the polymerization cycle, the unreacted monomers are stripped and the suspension is centrifuged to recover the beads of interpolymer. The Izod impact value of the resin is found to be about 0.4 foot pounds per inch of notch.

Part C

The graft polymerization component of Part A is then blended with the interpolymer of Part B to provide a composition containing 15 percent by weight of the butadiene/acrylonitrile rubber. Test specimens are molded therefrom and the following properties are determined with respect thereto:

| | |
|---|---|
| Tensile Stress, p.s.i. | |
| At yield | 7200 |
| At failure | 7100 |
| Percent Elongation | 46 |
| Tensile Modulus p.s.i. x $10^{-5}$ | 3.3 |
| Izod Impact, foot pounds per square inch notch | 2.23 |

Thus it can be seen that there is a substantial improvement in the properties of the matrix polymer at the 15 percent rubber value indicating good chemical and mechanical adhesion between the phases while maintaining desirable rubbery characteristics. Moreover, the blend is found to be transparent and does have excellent barrier properties to water vapor and oxygen transmission, rendering it highly suitable for packaging applications.

EXAMPLE TWO

Part A

The procedure of Part A of Example 1 is substantially repeated utilizing as the rubber substrate a butadiene/styrene (75/25) rubber latex having a particle size of about 0.7 micron. The first monomer formulation comprises 375 parts n-butyl acrylate and 125 parts styrene with the rubber solids content of the latex comprising 500 parts. Conversion in this first stage is 72 percent.

In the second stage a portion of the latex produced is utilized as the substrate, that portion containing 500 parts solids. The second monomer formulation comprises 325 parts methacrylonitrile and 35 parts styrene.

Part B

The graft polymerization component of Part A is blended with the methacrylonitrile/styrene component of Part B of Example 1 to a 15 percent rubber level. The following properties are determined from specimens molded therefrom:

| | |
|---|---|
| Tensile Stress, p.s.i. | |
| At yield | 6100 |
| At failure | 6300 |
| Percent Elongateion | 72 |
| Tensile Modulus | 3.7 |
| Izod Impact, foot pounds per square inch notch | 3.15 |

The blend is found to be transparent and again to have desirable barrier properties.

EXAMPLE THREE

A series of blends are prepared utilizing the matrix interpolymer of Part B of Example 1 and various graft polymerization blends formed by different polymerizable monomer formulations. In all instances the rubber content of the final blend is 15 percent by weight.

The results thereof are set forth in the following table:

| Type of rubber | Rubber particle size, micron | First stage monomers | Parts per 100 parts rubber | Second stage monomers | Parts per 100 parts rubber | Izod impact value, ft. lbs./ sq. in. notch | Clarity |
|---|---|---|---|---|---|---|---|
| Butadiene/styrene (75/25) | 0.7 | Butyl acrylate/styrene (75/25). | 100 | | | 0.32 | Opaque. |
| Do | 0.7 | do | 100 | Methacrylonitrile/styrene (90/10). | 100 | 3.15 | Clear. |
| Do | 0.7 | do | 50 | do | 100 | 0.37 | Do. |
| Do | 0.7 | do | 25 | do | 100 | 0.45 | Do. |
| Do | 0.08 | Butyl acrylate/styrene (80/20) | 100 | | | 0.40 | Opaque. |
| Do | 0.08 | do | 100 | Methacrylonitrile/styrene (90/10). | 100 | 1.2 | Clear. |
| Do | 0.08 | | | Methacrylonitrile/styrene (80/20) | 100 | 0.56 | Do. |
| Butadiene/acrylonitrile/ styrene (75/15/10). | 0.25 | | | Methacrylonitrile/styrene (90/10) | 100 | 1.2 | Do. |
| Do | 0.25 | Butyl acrylate/styrene (75/25). | 100 | do | 100 | 2.2 | Do. |

Thus it can be seen from the foregoing detailed specification and examples that the present invention provides improved high nitrile polymer blends affording desirable impact resistance, barrier properties to oxygen and water vapor transmission and transparency when properly formulated. These blends are highly useful for various applications including packaging where they serve to prevent degradation of the contents of the container. The method for producing the blends is relatively simple and yet highly effective in providing latex stability and satisfactory grafting efficiency with monomer formulations of high nitrile content.

What is claimed is:

1. In the method of preparing impact modified nitrile polymer compositions, the steps comprising:
   admixing a rubbery polymer substrate and a polymerizable monomer formulation consisting of at least 70 percent by weight of monomers selected from the group consisting of monovinylidene aromatic hydrocarbons, alkyl esters of unsaturated carboxylic acids, vinyl alkanoates, unsaturated carboxylic acids, vinyl ethers, and mixtures thereof;
   subjecting said admixture to polymerization conditions to effect polymerization of said monomer formulation and grafting of at least a substantial portion of the polymer being produced onto the rubbery polymer substrate to form a graft copolymer, said graft copolymer having a superstrate to substrate ratio of at least 10 : 100;
   thereafter admixing with said graft copolymer a second polymerizable monomer formulation consisting of at least 60 percent by weight ethylenically unsaturated nitrile monomer;
   and subjecting said second mentioned admixture to polymerization conditions to effect polymerization of the monomers thereof and to produce grafting of at least a substantial portion of the polymer being produced onto said graft copolymer to form a composite graft copolymer, said grafted polymers of said first and second admixtures providing a superstrate containing a total of at least 60 percent by weight ethylenically unsaturated nitrile monomer; wherein said first and second mentioned admixtures are aqueous emulsions containing the polymerizable monomer formulations and the rubbery polymer substrate and graft copolymer respectively.

2. The method as defined in claim 1 wherein said rubbery polymer substrate is a polymer of a rubber-forming diene monomer and 0–30 percent of an ethylenically unsaturated nitrile.

3. The method as defined in claim 1 wherein said rubbery polymer is a polymer of a rubber-forming diene monomer and 0–25 percent of a monovinylidene aromatic hydrocarbon.

4. The method as defined in claim 1 wherein said first-mentioned polymerizable monomer formulation contains a monovinylidene aromatic hydrocarbon monomer and an alkyl acrylate monomer.

5. The method as defined in claim 4 wherein said monovinylidene aromatic hydrocarbon is styrene and wherein said alkyl acrylate is butyl acrylate, said styrene monomer comprising 10–30 percent by weight of the monomer formulation, said butyl acrylate monomer comprising 80–50 percent by weight of the monomer formulation, and nitrile monomer comprising 0–20 percent by weight of the monomer formulation.

6. The method as defined in claim 1 wherein said second polymerizable monomer mixture consists at least principally of methacrylonitrile.

7. The method as defined in claim 6 wherein said second-mentioned polymerizable mixture contains 5–25 percent by weight styrene monomer and 95–75 percent by weight methacrylonitrile.

8. The method as defined in claim 1 wherein the rubbery polymer substrate has a particle size of about 0.2–0.8 micron.

9. The method as defined in claim 1 wherein the superstrate to substrate ratio of the combined polymers grafted onto the rubbery polymer substrate is 0.3–1.5:1.0.

10. The method as defined in claim 1 wherein said rubbery polymer substrate is a copolymer of butadiene and 10–30 percent of an ethylenically unsaturated nitrile and has an average particle size of about 0.2–0.8 micron.

11. The method as defined in claim 1 including the additional step of blending the composite graft copolymer with a matrix interpolymer of at least 60 percent by weight of ethylenically unsaturated nitrile monomer.

12. The method as defined in claim 11 wherein said matrix polymer is comprised at least principally of methacrylonitrile monomer.

13. The method as defined in claim 1 wherein said first-mentioned polymerizable monomer formulation and said second polymerizable monomer formulation are both produced as a part of a single, substantially continuous graft polymerization reaction in which there are introduced monomers during the course of the polymerization reaction to provide the different polymerizable monomer formulations.

14. A polymeric composition containing a composite graft copolymer having a substrate of a graftable rubbery polymer and a superstrate formed by two different polymers, one of said polymers being formed from a polymerizable monomer formulation consisting of at least 70 percent by weight of monomers selected from the group consisting of monovinylidene aromatic hydrocarbons, alkyl esters of unsaturated carboxylic acids, vinyl alkanoates, unsaturated carboxylic acids, vinyl ethers, and mixtures thereof, and the other of said polymers being a relatively polar shell formed from a polymerizable monomer formulation consisting of at least 60 percent by weight ethylenically unsaturated nitrile monomer, the total nitrile monomer content of said superstrate polymers being at least 60 percent by weight thereof.

15. The polymeric composition of claim 14 wherein there is additionally included a matrix polymer containing at least 60 percent by weight ethylenically unsaturated nitrile monomer component, said rubbery polymer substrate comprising 5–50 percent by weight of the total polymeric composition.

16. The polymeric composition of claim 14 wherein said first mentioned polymerizable formulation contains a methacrylonitrile monomer and an alkyl acrylate monomer and wherein said second polymerizable monomer formulation consists at least principally of methacrylonitrile.

17. The polymeric composition of claim 16 wherein there is additionally included a matrix polymer containing at least 60 percent by weight ethylenically unsaturated nitrile monomer component, said rubbery polymer substrate comprising 3–50 percent by weight of the total polymeric composition, said matrix polymer containing at least 50 percent methacrylonitrile.

18. The polymeric composition of claim 15 in the form of a molded container, said polymeric composition having oxygen permeability of less than 6.5 cc/100 sq. in. 24 hr. atmos. mil at 73° F. and water vapor transmission of less than 8.5 gms./24 hr. 100 sq. in. mil at 100° F. and 95 percent R.H.

* * * * *